US010797843B2

(12) United States Patent
Guan et al.

(10) Patent No.: US 10,797,843 B2
(45) Date of Patent: *Oct. 6, 2020

(54) METHOD AND DEVICE FOR DETECTING AND TRANSMITTING INFORMATION

(71) Applicant: HUAWEI TECHNOLOGIES CO., LTD., Shenzhen, Guangdong (CN)

(72) Inventors: Lei Guan, Beijing (CN); Yan Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

This patent is subject to a terminal disclaimer.

(21) Appl. No.: 16/216,348

(22) Filed: Dec. 11, 2018

(65) Prior Publication Data
US 2019/0123875 A1 Apr. 25, 2019

Related U.S. Application Data

(63) Continuation of application No. 14/167,537, filed on Jan. 29, 2014, now Pat. No. 10,200,173, which is a (Continued)

(30) Foreign Application Priority Data

Aug. 8, 2011 (CN) .......................... 2011 1 0225994

(51) Int. Cl.
*H04L 5/00* (2006.01)
(52) U.S. Cl.
CPC .......... *H04L 5/0051* (2013.01); *H04L 5/0053* (2013.01); *H04L 5/001* (2013.01);
(Continued)

(58) Field of Classification Search
CPC ..... H04L 5/0051; H04L 5/001; H04L 5/0053; H04L 5/0055; H04L 5/0035;
(Continued)

(56) References Cited

U.S. PATENT DOCUMENTS

| 2010/0097937 A1 | 4/2010 | Pietraski et al. |
| 2011/0064159 A1 | 3/2011 | Ko et al. |

(Continued)

FOREIGN PATENT DOCUMENTS

| CN | 101610564 A | 12/2009 |
| CN | 101860896 A | 10/2010 |

(Continued)

OTHER PUBLICATIONS

U.S. Appl. No. 14/167,537 U.S. Pat. No. 10,200,173, filed Jan. 24, 2014, Lei Guan et al.

(Continued)

*Primary Examiner* — Ricky Q Ngo
*Assistant Examiner* — Michael K Phillips
(74) *Attorney, Agent, or Firm* — Gregg L. Jansen

(57) ABSTRACT

Embodiments of the present invention disclose a method and a device for detecting and transmitting information. The method includes: obtaining, by a UE, at least one type of configuration information of an antenna port occupied by a D-PDCCH, which is configured on a base station side; determining, by the UE, a search space of the D-PDCCH; and detecting, by the UE, the D-PDCCH in the search space according to the antenna port configuration information. With the embodiments of the present invention, the UE can detect the D-PDCCH, and therefore data transmission is ensured. Furthermore, a blind detection of a PDCCH by the UE based on time-frequency resources in an existing system is extended to a spatial dimension, that is, an antenna port, thereby increasing the efficiency of resource utilization, so that the D-PDCCH can be detected in the spatial dimension.

13 Claims, 3 Drawing Sheets

Related U.S. Application Data continuation of application No. PCT/CN2012/079816, filed on Aug. 8, 2012.

(52) U.S. Cl.
CPC .......... *H04L 5/0023* (2013.01); *H04L 5/0035* (2013.01); *H04L 5/0055* (2013.01)

(58) Field of Classification Search
CPC .. H04L 5/0023; H04L 1/1861; H04W 72/042; H04W 72/044; H04W 72/0406; H04W 72/1289; H04W 48/12; H04W 48/16
See application file for complete search history.

(56) References Cited

U.S. PATENT DOCUMENTS

| | | |
|---|---|---|
| 2011/0103324 A1 | 5/2011 | Nam et al. |
| 2011/0268062 A1* | 11/2011 | Ji .................... H04J 11/005 370/329 |
| 2012/0033627 A1 | 2/2012 | Li et al. |
| 2012/0044881 A1 | 2/2012 | Luo et al. |
| 2012/0052899 A1 | 3/2012 | Wang et al. |
| 2012/0155413 A1 | 6/2012 | Liu et al. |
| 2012/0182931 A1 | 7/2012 | Shen et al. |
| 2012/0201216 A1 | 8/2012 | Wu |
| 2012/0243499 A1 | 9/2012 | Moon et al. |
| 2012/0275400 A1 | 11/2012 | Chen et al. |
| 2012/0282936 A1 | 11/2012 | Gao et al. |
| 2012/0320846 A1* | 12/2012 | Papasakellariou .. H04W 72/044 370/329 |
| 2013/0039318 A1 | 2/2013 | Wang |
| 2013/0064174 A1 | 3/2013 | Kim et al. |
| 2014/0112252 A1 | 4/2014 | Hoymann et al. |
| 2014/0112290 A1 | 4/2014 | Chun et al. |
| 2014/0126531 A1* | 5/2014 | Kang .................. H04L 5/0053 370/330 |
| 2014/0146775 A1 | 5/2014 | Guan et al. |
| 2014/0169315 A1 | 6/2014 | Han et al. |
| 2014/0169317 A1 | 6/2014 | Gao et al. |
| 2014/0334453 A1 | 11/2014 | Ko et al. |
| 2015/0163771 A1 | 6/2015 | Kim et al. |

FOREIGN PATENT DOCUMENTS

| | | |
|---|---|---|
| CN | 102014503 A | 4/2011 |
| CN | 102036297 A | 4/2011 |
| CN | 102056198 A | 5/2011 |
| CN | 102056316 A | 5/2011 |
| CN | 102076098 A | 5/2011 |
| CN | 102932090 A | 2/2013 |
| JP | 5830609 B2 | 12/2015 |
| WO | 2011019242 A2 | 2/2011 |
| WO | 2011020433 A1 | 2/2011 |
| WO | 2011043616 A2 | 4/2011 |
| WO | 2011050751 A1 | 5/2011 |
| WO | 2011071310 A9 | 11/2011 |

OTHER PUBLICATIONS

"3rd Generation Partnership Project; Technical Specification Group Radio Access Network; Evolved Universal Terrestrial Radio Access (E-UTRA);Physical layer procedures (Release 10)," 3GPP TS 36.213 V10.2.0(Jun. 2011) Technical Specification, 2011, pp. 1-120, 3GPP Organizational Partners, Valbonne, France.

"3rd Generation Partnership Project; Technical Specification Group Radio Access Network; Evolved Universal Terrestrial Radio Access (E-UTRA);Physical Channels and Modulation (Release 10)," 3GPP TS 36.211 V10.2.0 (Jun. 2011) Technical Specification, 2011, pp. 1-103, 3GPP Organizational Partners, Valbonne, France.

R1-111661 Research In Motion, UK Limited, "PDCCH Enhancement Considerations," 3GPP TSG RAN WG1 Meeting #65, Spain, Barcelona May 9-13, 2011, pp. 1-4.

R1-103183 Motorola, "DM-RS Layer Mapping and Controlling Signalling," 3GPP TSG RAN WG1 Meeting #61, Montreal, Canada, May 10-14, 2010, pp. 1-6.

R1-106086 Panasonic, "R-PDCCH Search Space Design," 3GPP TSG RAN WG1 Meeting #63, Jacksonville, USA, Nov. 15-19, 2010, pp. 1-3.

ETRI, "Remaining details of non-interleaving R-PDCCH search space," 3GPP TSG RAN WG1 Meeting #63 Jacksonville, USA, Nov. 15-19, 2010,R1-106169, Nov. 9, 2010, 4 pages.

Huawei, "Search Space for R-PDCCH," 3GPP TSG RAN WG1 Meeting #62, Madrid, Spain, Aug. 23-27, 2010, R1-104511, Aug. 17, 2010, 3 pages.

International Search Report dated Nov. 15, 2012, in corresponding International Patent Application No. PCT/CN2012/079816.

Office Action, dated Oct. 15, 2018, in Chinese Application No. 201610423932.6 (6 pp.).

Japanese Notice of Allowance dated Jan. 9, 2018 in corresponding Japanese Patent Application No. 2017-006685.

Japanese Office Action dated Aug. 23, 2016 in corresponding Japanese Patent Application No. 2015-208734.

European Office Action dated Dec. 16, 2015 in corresponding European Patent Application No. 12821462.4.

Chinese Office Action dated Aug. 29, 2014 in corresponding Chinese Patent Application No. 201110225994.3.

Chinese Search Report dated Aug. 24, 2014 in corresponding Chinese Patent Application No. 201110225994.3.

Japanese Office Action dated Jan. 27, 2015 in corresponding Japanese Patent Application No. 2014-524258.

Extended European Search Report dated May 30, 2014 in corresponding European Patent Application No. 12821462.4.

Notice of Allowance, dated Sep. 19, 2018, in U.S. Appl. No. 14/167,537.

Final Office Action, dated May 16, 2018, in U.S. Appl. No. 14/167,537.

Office Action, dated Dec. 21, 2017, in U.S. Appl. No. 14/167,537.

Final Office Action, dated Jul. 5, 2017, in U.S. Appl. No. 14/167,537.

Office Action, dated Dec. 30, 2016, in U.S. Appl. No. 14/167,537.

Office Action, dated Jun. 9, 2016, in U.S. Appl. No. 14/167,537.

Office Action, dated Sep. 18, 2015, in U.S. Appl. No. 14/167,537.

* cited by examiner

METHOD AND DEVICE FOR DETECTING AND TRANSMITTING INFORMATION

CROSS-REFERENCE TO RELATED APPLICATION

This application is a continuation of U.S. patent application Ser. No. 14/167,537, filed on Jan. 29, 2014, which is a continuation of International Application No. PCT/CN2012/079816, filed on Aug. 8, 2012, which claims priority to Chinese Patent Application No. 201110225994.3, filed on Aug. 8, 2011, all of which are hereby incorporated by reference in their entireties.

TECHNICAL FIELD

The present invention relates to a wireless communication system, and in particular, to a method and a device for detecting and transmitting information.

BACKGROUND

In an existing long term evolution (LTE) system, a subframe is a smallest time unit scheduled by a base station (eNB, Evolved NodeB), each subframe includes two timeslots, and each timeslot includes seven symbols. For a scheduled UE, a subframe includes a physical downlink control channel (PDCCH, Physical Downlink Control Channel) of the user equipment (UE, User Equipment), where the PDCCH is borne in first n symbols of the subframe, and n may be any one of 1, 2, and 3, or any one of 2, 3, and 4 (in a case where the system bandwidth is 1.4 MHz).

The PDCCH carries a downlink scheduling grant (DL_grant, Downlink_grant) or an uplink scheduling grant (UL_grant, Uplink_grant), which respectively carries scheduling information of a physical downlink shared channel (PDSCH) or a physical uplink shared channel (PUSCH). Depending on different specific data types (for example, multiple input multiple output (MIMO) and non-MIMO data), the PDCCH may have different downlink control information (DCI, Downlink Control Information) formats. For example, the DCI formats may be 0, 1, 1A, 2, 2A, 2B, and 2C. A payload size (referred to as a payload size in a standard text) of the PDCCH corresponding to these DCI formats generally varies.

In the existing LTE system, PDCCH demodulation is uniformly based on a cell-specific reference signal (CRS, Cell-specific Reference Signal). FIG. 1 is a schematic diagram showing that a PDSCH is scheduled by a PDCCH in a subframe in the prior art. In FIG. 1, a horizontal axis represents a time domain, and a vertical axis represents a frequency domain. In the prior art, PDCCH information does not undergo MIMO precoding processing, and the UE may obtain information of an antenna port for transmitting PDCCH by detecting a broadcast channel. Specifically, after the UE demodulates and decodes a PDCCH in time-frequency resources of a search space of the PDCCH according to the payload size of the PDCCH and an aggregation level of a control channel element (CCE), the UE uses a UE-specific radio network temporary identifier (RNTI) to perform descrambling CRC to check and determine the PDCCH of the UE, and performs, according to scheduling information in the PDCCH, corresponding reception and transmission processing for a PDSCH or PUSCH scheduled by the PDCCH.

In an LTE system of a later release, technologies such as carrier aggregation, multi-user multiple input multiple output (MIMO, Multiple Input Multiple Output), and coordinated multiple points (CoMP, Coordinated Multiple Points) will be introduced. In addition, a heterogeneous network scenario will be widely applied. All these will lead to a capacity limitation on the PDCCH. Therefore, a PDCCH based on channel information precoding will be introduced. This PDCCH will be demodulated based on a UE-specific reference signal. In this case, the UE-specific reference signal may be referred to as a dedicated reference signal (DRS, Dedicated Reference Signal), while the PDCCH demodulated based on the DRS is briefed as a D-PDCCH. Through the D-PDCCH, a precoding gain may be obtained to improve performance.

FIG. 2 is a schematic diagram showing that a PDSCH is scheduled by a D-PDCCH in a subframe in the prior art. D-PDCCH resources are located in a PDSCH region, and the D-PDCCH and the PDSCH scheduled by the D-PDCCH are divided by frequencies.

However, in the prior art, the UE can only detect the PDCCH based on a non-precoding manner and according to the CRS. For the D-PDCCH based on MIMO precoding, the prior art does not provide a detection method. If the D-PDCCH cannot be detected, data transmission is definitely impossible. Therefore, how to ensure that the UE detects the D-PDCCH is a pressing issue to be solved.

SUMMARY

Embodiments of the present invention provide a method and a device for detecting and transmitting information, so that a UE can detect a D-PDCCH.

An embodiment of the present invention provides a method for detecting information, including:
obtaining, by a UE, at least one type of configuration information of an antenna port occupied by a D-PDCCH, which is configured on a base station side;
determining, by the UE, a search space of the D-PDCCH; and
detecting, by the UE, the D-PDCCH in the search space according to the antenna port configuration information.

An embodiment of the present invention further provides a method for transmitting information, where the method is applicable to a base station and includes:
configuring, by a base station, at least one type of configuration information of an antenna port occupied by a D-PDCCH for a UE;
determining, by the base station, search space information of the D-PDCCH; and
transmitting, by the base station, the D-PDCCH in the search space to the UE according to the at least one type of configuration information of an antenna port occupied by the D-PDCCH which is configured for the UE.

An embodiment of the present invention further provides a user equipment, including:
an obtaining unit, adapted to obtain at least one type of configuration information of an antenna port occupied by a D-PDCCH, which is configured on a base station side;
a determining unit, adapted to determine a search space of the D-PDCCH; and
a detecting unit, adapted to detect the D-PDCCH in the search space according to the antenna port configuration information.

An embodiment of the present invention further provides a base station, including:
a configuring unit, adapted to configure at least one type of configuration information of an antenna port occupied by a D-PDCCH for a UE;

a search space determining unit, adapted to determine search space information of the D-PDCCH; and a transmitting unit, adapted to transmit the D-PDCCH in the search space to the UE according to the at least one type of configuration information of an antenna port occupied by the D-PDCCH which is configured for the UE.

With the method and the device provided by the embodiments of the present invention, a UE can detect a D-PDCCH, and therefore data can be transmitted according to the detected D-PDCCH. Furthermore, a blind detection of a PDCCH by the UE based on time-frequency resources in an existing system is extended to a spatial dimension, that is, an antenna port, thereby increasing the efficiency of resource utilization, so that the D-PDCCH can be detected in the spatial dimension. In this way, a D-PDCCH detection method is provided, the flexibility of scheduling of the D-PDCCH in MU-MIMO is improved, and the reception performance of the PDCCH is improved; in addition, it is ensured that the count of blind detections by the UE is not greater than that in the existing system, that is, the implementation complexity of the UE is not increased.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

For better describing this application, the following first describes a search space and the count of searches briefly.

The search space itself is an existing concept in the prior art, and is only briefly described herein. The search space is a segment of resources defined according to a control channel element (CCE), where the CCE is an element forming a PDCCH. According to the channel condition, a UE may use four CCE aggregation levels (corresponding to different encoding rates) for transmission, that is, 1, 2, 4, and 8. Each UE has a specific search space. A UE-specific search space is determined by a UE-specific RNTI, a CCE aggregation level, and a subframe number.

For detecting a PDCCH corresponding to a DCI format, the count of blind detections to be performed by the UE, that is, the count of searches, of a candidate PDCCH in the search space corresponding to the four CCE aggregation levels, is 6, 6, 2, and 2 respectively, and the total count is 6+6+2+2=16.

An eNB configures a transmission mode of data channel transmission for the UE through RRC dedicated signaling. In each transmission mode, the UE needs to blindly detect two DCI formats (possibly three DCI formats if uplink MIMO is considered), where one (possibly two if uplink MIMO is considered) is a DCI format related to the current mode, for example, DCI format 1, 2, 2A, 2C, and 4, and the other is a common DCI format in each mode, generally DCI format 0 or 1A (the two are respectively a UL_grant and DL_grant with an equal payload size, and are distinguished by header bits in signaling, and therefore are used as a DCI format herein). Considering that the UE determines, according to a transmission mode, two DCI formats to be detected, in combination with the foregoing count of blind detections required by the UE for detecting each DCI format, the total count of blind detections in the UE-specific search space by the UE is 2*(6+6+2+2)=32.

Embodiment 1

Figure 1:
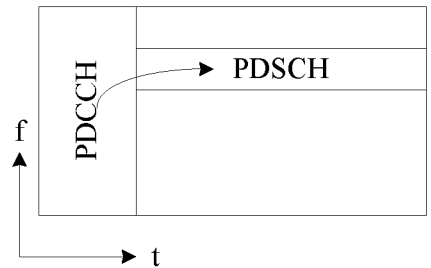
FIG. 1 is a schematic diagram showing that a PDSCH is scheduled by a PDCCH in a subframe in the prior art.
Figure 2:
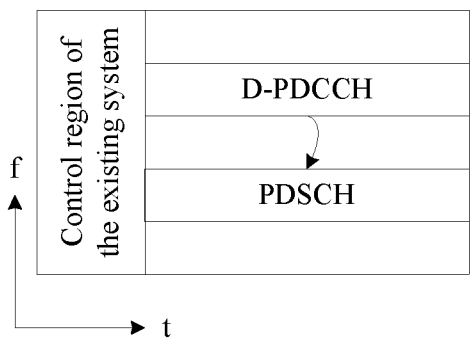
FIG. 2 is a schematic diagram showing that a PDSCH is scheduled by a D-PDCCH in a subframe in the prior art.
Figure 3:
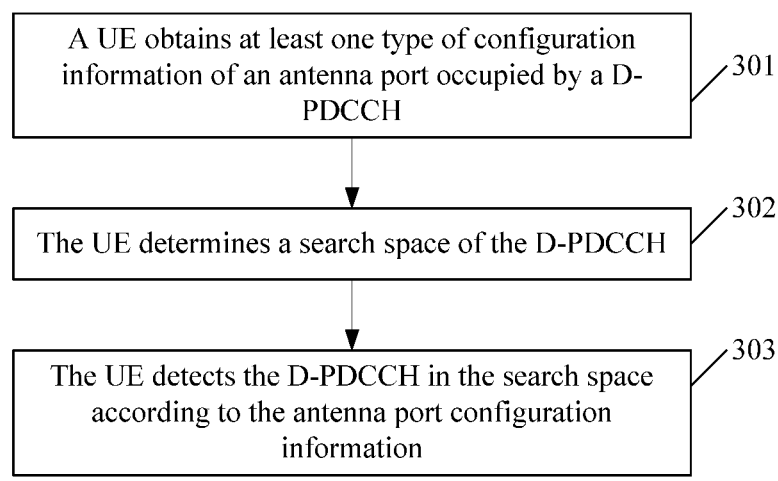
FIG. 3 is a flowchart of a method for detecting information according to an embodiment of the present invention.

FIG. 3 is a flowchart of a method for detecting information according to an embodiment of the present invention. The procedure is applicable to a user equipment terminal, and may specifically include:

Step 301: A UE obtains at least one type of configuration information of an antenna port occupied by a D-PDCCH, which is configured on a base station side.

In a possible embodiment, the antenna port configuration information includes at least antenna port information, and scrambling code ID information and codeword information of a UE-specific reference signal corresponding to an antenna port. The antenna port information includes antenna port numbers and the quantity of antenna ports; the scrambling code ID information includes scrambling code ID numbers; and the codeword information includes codeword numbers and the quantity of codewords.

In another possible embodiment, the antenna port configuration information may further include one or any combination of the following in addition to the above information: a length of an orthogonal spreading code of the UE-specific reference signal corresponding to an antenna port, and a mapping relationship between antenna port information and codeword information.

The antenna port configuration information may be obtained through broadcast signaling, or radio resource control (RRC, Radio Resource Control) dedicated signaling, or media access control (MAC, Media Access Control) layer signaling, or physical layer signaling, where the physical layer signaling may be a PDCCH.

In this application, the type of the antenna port configuration information is determined according to a combination of specific parameters in the antenna port configuration information, for example, determined according to a combination of the antenna port information, and scrambling code ID information and codeword information of a UE-specific reference signal corresponding to an antenna port.

The two parameters, antenna port information and codeword information, may respectively include a quantity and value, for example, the quantity of antenna ports, the quantity of codewords, antenna port numbers, and codeword numbers; the parameter, scrambling code ID information of a UE-specific reference signal, includes a scrambling code ID number of a UE-specific reference signal. For example, for a combination of the parameters, if the D-PDCCH is transmitted on a port with antenna port number 7 (the quantity of antenna ports is 1), and the scrambling code ID number of a UE-specific reference signal is 0, and the codeword number is 0 (the quantity of codewords is 1), one type of antenna port configuration information may be obtained according to the above combination of parameters. For another combination of the parameters, if the D-PDCCH is transmitted on a port with antenna port number 8 (the quantity of antenna ports is 1), and the scrambling code ID number of a UE-specific reference signal is 1, and the codeword number is 1 (the quantity of codewords is 1), another type of antenna port configuration information may be obtained according to the above combination of parameters. For another combination of the parameters, if the D-PDCCH is transmitted on ports with antenna port numbers 7 and 8 (the quantity of antenna ports is 2), and the scrambling code ID number of a UE-specific reference signal is 0, and the codeword numbers are 0 and 1 (the quantity of codewords is 2), another type of antenna port configuration information may be obtained. In the following embodiments, for ease of description, an example in which antenna port configuration information is antenna port information is used in most embodiments, and in this case, assuming that the codeword information and scrambling code ID information of a UE-specific reference signal are both specific, for example, a single codeword 0 and a scrambling code ID numbered 0.

Step 302: The UE determines a search space of the D-PDCCH, where the search space indicates a position to be detected, of at least one candidate D-PDCCH of the D-PDCCH in time-frequency resources.

As in the prior art, the search space may be a block of resources defined according to the CCE; in this case, a CCE is a smallest unit of the aggregation level. The search space may also be a block of resources defined according to a resource block (RB, Resource Block) or an RB pair; in this case, an RB or an RB pair is a smallest unit of the aggregation level.

The search space may be obtained through the broadcast signaling, RRC dedicated signaling, or PDCCH transmitted by the base station side, or may be determined and fed back by the UE itself to the base station side.

The search space may be a determined position in the time-frequency resources, that is, if the UE is scheduled, the eNB will definitely transmit the D-PDCCH in the position. Correspondingly, the UE will directly detect the D-PDCCH in the position.

The search space may also be multiple candidate positions in time-frequency resources, that is, if the UE is scheduled, the eNB may select one from the candidate positions to transmit the D-PDCCH, and the UE will perform a blind detection of the D-PDCCH in the candidate positions.

Step 303: The UE detects the D-PDCCH in the search space according to the antenna port configuration information.

According to the above procedure, in a possible embodiment, it is assumed that the eNB notifies a type of antenna port configuration information of the D-PDCCH to the UE, and specifically, notifies the UE that the D-PDCCH to be detected by the UE is on antenna port 7. Therefore, after receiving the information, the UE detects D-PDCCH information on antenna port 7 according to the determined search space. In this way, after the UE learns information of an antenna port for transmitting P-PDCCH, the UE may detect, on the antenna port, the D-PDCCH transmitted by the eNB, thereby ensuring data transmission.

In another possible embodiment, it is assumed that the eNB notifies two types of antenna port configuration information of the D-PDCCH to the UE, and specifically, notifies the UE that the D-PDCCH to be detected by the UE is on antenna port 7, or on antenna ports 7 and 8. Therefore, after receiving the information, the UE detects D-PDCCH information on antenna port 7 in a single-antenna-port manner, and also detects D-PDCCH information on antenna ports 7 and 8 in a two-antenna-port manner according to the determined search space.

It should be noted that the procedure in FIG. 3 may further include:

obtaining, by the UE, a mapping relationship between the antenna port configuration information and second information; in this case, the UE detects the D-PDCCH in the search space according to the antenna port configuration information and the mapping relationship.

The mapping relationship between the antenna port configuration information and second information includes any one or any combination of the following mapping relationships:

a mapping relationship between the antenna port configuration information and a DCI format used by the D-PDCCH;

a mapping relationship between the antenna port configuration information and an aggregation level of the D-PDCCH;

a mapping relationship between the antenna port configuration information and resources occupied by the D-PDCCH; and a mapping relationship between the antenna port configuration information and scheduling information of each carrier borne in the D-PDCCH.

The following describes the above mapping relationships respectively.

A. The UE obtains a mapping relationship between the antenna port configuration information and at least one DCI format corresponding to the D-PDCCH; in this case, the step of detecting the D-PDCCH in the search space includes: detecting, by the UE, the D-PDCCH in the search space according to the antenna port configuration information and the mapping relationship. The antenna port configuration information may include one type, and therefore the mapping relationship may be a one-to-one or one-to-many mapping relationship; or the antenna port configuration information may include at least two types, and therefore the mapping relationship may be a many-to-one or many-to-many mapping relationship.

Antenna port information is used as an example to describe how the antenna port configuration information corresponds to the used DCI format.

When the mapping relationship is a one-to-one mapping relationship, it indicates that the D-PDCCH corresponding to a DCI format is transmitted in one antenna port configuration. For example, the D-PDCCH corresponding to a DCI format is transmitted on antenna port 7.

When the mapping relationship is a one-to-many mapping relationship, it indicates that the D-PDCCHs corresponding to multiple DCI formats are all transmitted in one antenna port configuration. For example, the D-PDCCHs corresponding to two DCI formats are all transmitted on antenna port 7.

When the mapping relationship is a many-to-one mapping relationship, it indicates that the D-PDCCH corresponding to a DCI format may be transmitted in multiple antenna port configurations. For example, the D-PDCCH corresponding to a DCI format is transmitted on antenna port 7 or 8. When the mapping relationship is a many-to-many mapping relationship, it indicates that the D-PDCCHs corresponding to multiple DCI formats are transmitted in multiple antenna port configurations. For example, the D-PDCCHs corresponding to two DCI formats are all transmitted on antenna port 7 or 8.

For ease of description, a symbol { } is introduced to indicate a transmission manner in which the D-PDCCH is transmitted in an antenna port configuration. Specifically, {7} indicates that the D-PDCCH is transmitted on antenna port 7 in a single-antenna port manner, that is, the UE detects the D-PDCCH on antenna port 7 in a single-antenna-port manner; {7, 8} indicates that the D-PDCCH is transmitted on antenna ports 7 and 8 in a two-antenna-port manner, that is, the UE detects the D-PDCCH on antenna ports 7 and 8 in a two-antenna-port manner. For other antenna port numbers and the quantity of antenna ports in { }, explanations are similar.

Specifically, the UE may map antenna ports of the D-PDCCH according to different DCI formats in a carrier configuration. It is assumed that the UE is configured with two carriers by the eNB, and in this case, the DCI formats to be detected by the UE include a first DCI format bearing scheduling information of a single carrier (the single carrier may be a primary carrier), and a second DCI format bearing joint scheduling information of the two carriers. For the former, the UE may detect the D-PDCCH based on a single antenna port, for example, based on antenna port {7}, or perform blind detections for antenna ports {7} and {8} respectively. For the latter, there are the following three situations:

Situation 1: The UE may detect the D-PDCCH based on two antenna ports, for example, antenna ports {7, 8}, and in this case, no blind detection is required for the antenna ports.

Situation 2: The UE performs blind detections for ports {7, 8} and {9, 10} respectively based on two antenna ports. The benefit is that MU-MIMO transmission of the D-PDCCH may be performed dynamically and flexibly in pairs with other UEs. Specifically, assuming that the D-PDCCH is transmitted by using 4 layers but the UE uses antenna ports {7, 8}, another UE1 may use antenna ports {9, 10}. If the channel of the UE is not applicable to pairing with UE1 but is applicable to pairing with UE2, but the ports of UE2 are configured as {7, 8}, the UE may use ports {9, 10} to perform pairing with UE2. In this way, by performing blind detections for different ports, the flexibility of scheduling of the D-PDCCH by the system in MU-MIMO transmission is improved.

Situation 3: At least one DCI format corresponds to at least two antenna port configurations, where the quantities of antenna ports of the two antenna port configurations are different. That is, the UE may perform blind detections for configurations of different quantities of antenna port. Specifically, for the second DCI format, the antenna ports that may be configured are {7, 8} and {7}. The benefit is that in a subframe, the eNB needs to transmit the D-PDCCH corresponding to the second DCI format to schedule two carriers of the UE. If the channel can support two-layer transmission at this time, the eNB may use antenna ports {7, 8} to transmit the second DCI format. If the channel can support only one-layer transmission at this time, the eNB may fall back to antenna port {7} to transmit the second DCI format. Therefore, the UE may dynamically adapt to a channel change and complete data transmission by blindly detection for configurations of different quantities of port.

Further, in another embodiment, when the first DCI format corresponds to the first antenna port configuration information, the second DCI format corresponds to the second antenna port configuration information, and the payload size of the D-PDCCH corresponding to the first DCI format is equal to the payload size of the D-PDCCH corresponding to the second DCI format and the payload sizes may be distinguished by using information in the two DCI formats, the D-PDCCH corresponding to the first DCI format and the D-PDCCH corresponding to the second DCI format may share the first and second antenna port configuration information. For example, if the first DCI format corresponds to antenna port 7, the second DCI format corresponds to antenna port 8, and payload sizes of the two DCI formats are equal and are distinguished by using a header bit in the two DCI formats, both the D-PDCCHs corresponding to the first DCI format and second DCI format can be transmitted on port 7 and port 8. Correspondingly, the UE needs to detect the D-PDCCHs corresponding to the two DCI formats on both ports 7 and 8, and distinguish the DCI formats by using the header bit in the two DCI formats.

The above solution is extended to a carrier dimension, and the D-PDCCH corresponding to the DCI includes information indicating carrier scheduling, for example, a carrier indicator field specifically indicates which one or which several carriers are scheduled. Specifically, when the D-PDCCH corresponding to at least two DCI formats scheduling a first carrier corresponds to the first antenna port configuration information, the D-PDCCH corresponding to at least two DCI formats scheduling a second carrier corresponds to the second antenna port configuration information, and if at least one first DCI format in the at least two DCI formats scheduling the first carrier has the same payload size as at least one second DCI format in the at least two DCI formats scheduling the second carrier, the D-PDCCHs corresponding to the first DCI format and second DCI format may share the first and second antenna port configuration information. For example, if DCI format 1 and DCI format 2 scheduling the first carrier correspond to antenna port 7, DCI format 3 and DCI format 4 scheduling the second carrier correspond to antenna port 8, and DCI format 1 has the same payload size as DCI format 3, the D-PDCCHs corresponding to DCI format 1 and DCI format 3 can all be transmitted on port 7 and port 8. Correspondingly, the UE needs to detect the D-PDCCHs corresponding to DCI format 1 and DCI format 3 on both ports 7 and 8 and distinguish DCI format 1 and DCI format 3 by using a carrier indicator field. However, DCI format 2 scheduling the first carrier may be transmitted on only port 7, and DCI format 4 scheduling the second carrier may be transmitted on only port 8 (assuming that payload sizes of DCI format 2 and DCI format 4 are not equal). In the above solution, different DCI formats having the same payload size or the DCI formats corresponding to different carriers may share antenna port configuration information, which does not result in an increase of the count of extra blind detections of the D-PDCCH by the UE.

B. The UE obtains a mapping relationship between the antenna port configuration information and an aggregation level of the D-PDCCH; in this case, the step of detecting the D-PDCCH in the search space includes: detecting, by the UE, the D-PDCCH in the search space according to the antenna port configuration information and the mapping relationship. The antenna port configuration information may include one type, and therefore the mapping relationship may be a one-to-one or one-to-many mapping relationship; or the antenna port configuration information may include at least two types, and therefore the mapping relationship may be a many-to-one or many-to-many mapping relationship.

For example, D-PDCCHs of aggregation levels 1 and 4 are transmitted on antenna port {7}, and D-PDCCHs of aggregation levels 2 and 8 are transmitted on antenna port {8}. In this way, the D-PDCCH may be detected according to the mapping relationship between the antenna port used in transmission and the aggregation level.

C. The UE obtains a mapping relationship between the antenna port configuration information and resources occupied by the D-PDCCH; in this case, the step of detecting the D-PDCCH in the search space includes: detecting, by the UE, the D-PDCCH in the search space according to the antenna port configuration information and the mapping relationship. The resources occupied by the D-PDCCH include one or more of time, frequency, and code resources. The antenna port configuration information may include one type, and therefore the mapping relationship may be a one-to-one or one-to-many mapping relationship; or the antenna port configuration information may include at least two types, and therefore the mapping relationship may be a many-to-one or many-to-many mapping relationship.

Antenna port information is used as an example to describe how the antenna port configuration information corresponds to resources.

Using time-domain resources as an example, when the current subframe is a type-1 subframe, the D-PDCCH is transmitted on antenna port 7, and when the current subframe is a type-2 subframe, the D-PDCCH is transmitted on antenna port 8. The type-1 and type-2 subframes may correspond to an odd subframe number and an even subframe number respectively, that is, the subframe corresponding to the odd subframe number is a type-1 subframe, and the subframe corresponding to the even subframe number is a type-2 subframe. Or the type-1 and type-2 subframes are distinguished by using T as a period; from subframe 1 to subframe T, antenna port 7 is used for transmission; from subframe T+1 to subframe 2T, antenna port 8 is used for transmission; from subframe 2T+1 to subframe 3T, antenna port 7 is used for transmission; from subframe 3T+1 to subframe 4T, antenna port 8 is used for transmission, and so on, where subframe 1 to subframe T, and subframe 2T+1 to subframe 3T are type-1 subframes, and subframe T+1 to subframe 2T, and subframe 3T+1 to subframe 4T are type-2 subframes.

In brief, the UE obtains a mapping relationship between the antenna port configuration information and the time-domain resources where the D-PDCCH is located, specifically, for example, port 7 corresponds to an odd subframe, and port 8 corresponds to an even subframe.

The UE detects the D-PDCCH on port 7 in the case of an odd subframe according to the above mapping relationship; and detects the D-PDCCH on port 8 in the case of an even subframe.

The antenna port configuration information of the D-PDCCH may further correspond to a candidate detection position in an RB or in a CCE or at a specific aggregation level. Specifically, the antenna port configuration information may include one type, and therefore the mapping relationship may be a one-to-one or one-to-many mapping relationship; or the antenna port configuration information may include at least two types, and therefore the mapping relationship may be a many-to-one or many-to-many mapping relationship.

Specifically, using a candidate detection position at a specific aggregation level as an example, assuming that 6 positions of candidate D-PDCCHs in the search space of aggregation level 1 are P1, P2, . . . , and P6, the UE may detect the D-PDCCH in the time-frequency positions of P1, P2, and P3 of antenna port 7 and detect the D-PDCCH in the time-frequency positions of P4, P5, and P6 of antenna port 8. For search spaces of other aggregation levels and other mapping relationships, similar processing is performed, which is not limited herein. For another example, different antenna port configurations of the D-PDCCH may correspond to different time-frequency domain search spaces. For example, antenna port 7 corresponds to search space 1, and antenna port 8 corresponds to search space 2. The specific search space may be determined by using a preset rule, for example, by using a UEID and antenna port information. In this case, the UE may detect the D-PDCCH in search space 1 of antenna port 7, and detect the D-PDCCH in search space 2 of antenna port 8. Preferably, time-frequency resources in the search spaces corresponding to different antenna configurations do not overlap. For example, P1, P2, and P3 do not overlap with P4, P5, and P6, or time-frequency resources in search space 1 and search space 2 do not overlap, so that it is convenient for the UE to perform parallel processing respectively according to different antenna ports, thereby reducing the implementation complexity on the UE side. Optionally, P1, P2, and P3 may also overlap with P4, P5, and P6, that is, only three candidate positions are occupied on the time-frequency resources, but the positions are spatially at multiple layers.

The mapping relationship between other frequency or code resources or the combination of resources, and the antenna port configuration information is similar to that of the above time-frequency resources, and is not further described herein.

D. The UE obtains a mapping relationship between the antenna port configuration information and scheduling information of each carrier borne in the D-PDCCH; in this case, the step of detecting the D-PDCCH in the search space includes: detecting, by the UE, the D-PDCCH in the search space according to the antenna port configuration information and the mapping relationship. The antenna port configuration information may include one type, and therefore the mapping relationship may be a one-to-one or one-to-many mapping relationship; or the antenna port configuration information may include at least two types, and therefore the mapping relationship may be a many-to-one or many-to-many mapping relationship.

Antenna port information is used as an example to describe how antenna port configuration information corresponds to scheduling information of each carrier. For example, the eNB configures two carriers for the UE, which are CC1 and CC2 respectively. The mapping relationship may be: scheduling information scheduling CC1 is transmitted on antenna port 7, and scheduling information scheduling CC2 is transmitted on antenna port 8. Specifically, when the eNB uses two D-PDCCHs to schedule CC1 and CC2 respectively, scheduling information of CC1 may correspond to codeword 1, and scheduling information of CC2 may correspond to codeword 2, where codeword 1 corresponds to antenna port 7, and codeword 2 corresponds to antenna port 8.

Further, scheduling information may be divided into scheduling information shared by CC1 and CC2 (for example, a modulation and coding scheme field), and respective independent scheduling information of CC1 and CC2 (for example, a resource allocation field); the respective independent scheduling information of CC1 and CC2 is transmitted on antenna ports 7 and 8 respectively, and the scheduling information shared by CC1 and CC2 is transmitted on only one of antenna ports 7 and 8.

The antenna port configuration information may also have a mapping relationship with the quantity of scheduled carriers. For example, if a D-PDCCH bears scheduling information of a carrier, the UE may detect the D-PDCCH based on a single antenna port, where the port configuration may be {7} or {8}; if a D-PDCCH bears joint scheduling information of two or three carriers, the UE may detect the D-PDCCH based on two antenna ports, where the port configuration may be {7, 8} or {9, 10}; if a D-PDCCH bears joint scheduling information of four or five carriers, the UE may detect the D-PDCCH based on four antenna ports, where the port configuration may be {7, 8, 9, 10} or {11, 12, 13, 14}.

It should be noted that on the basis of the procedure shown in FIG. 3, one or any combination of the A, B, C, and D may be included; in addition, the A, B, C, and D are in no strict order. That is, on the basis of the procedure shown in FIG. 3, A, or A and C, or A, C, and D may be included, and so on. When more than two mapping relationships are included, the mapping relationships may be transferred. For example, if both A and B are included, the mapping relationship between the antenna port configuration information and at least one DCI format corresponding to the D-PDCCH in A, and the mapping relationship between the antenna port configuration information and an aggregation level of the D-PDCCH in B, coexist. In this case, it may also be understood that a mapping relationship exists between the antenna port configuration information, at least one DCI format, and the aggregation level.

For example, the D-PDCCH corresponding to the first DCI format is transmitted by using aggregation levels 1 and 4, and is transmitted on antenna port 7; the D-PDCCH corresponding to the second DCI format is transmitted by using aggregation levels 2 and 8, and is transmitted on antenna port 8. In this way, the mapping relationship between the DCI format, the aggregation level, and antenna port information is implemented.

All the above embodiments are described by using antenna port information as an example. The following uses an example in which antenna port configuration information is antenna port information and a codeword number (the scrambling code ID is specific, for example, a scrambling code ID number 0), so as to describe how the antenna port information and the codeword number correspond to scheduling information of each carrier borne in the D-PDCCH:

For example, assuming that the D-PDCCH uses two codewords (the codeword numbers are codeword 1 and codeword 2) for transmission and that the carriers currently configured for the UE are component carrier (CC, Component Carrier) 1, CC2, and CC3, the mapping relationship between the codeword numbers and the DCI formats may be: the first DCI format corresponding to scheduling information scheduling CC1 corresponds to codeword 1, and the second DCI format corresponding to the joint scheduling information scheduling CC2 and CC3 corresponds to codeword 2. Further, codeword 1 corresponds to antenna port 7, and codeword 2 corresponds to antenna port 8. Therefore, all scheduling information scheduling CC1, CC2, and CC3 may share same time-frequency resources through MIMO transmission of multiple codewords, thereby increasing the efficiency of resource utilization in D-PDCCH transmission. Preferably, the CC1 corresponding to codeword 1 may be a primary carrier, that is, the DCI format corresponding to the primary carrier separately occupies a codeword to improve the reception performance of the D-PDCCH scheduling the primary carrier.

For another example, antenna port configuration information may correspond to at least two parts of control information in the D-PDCCH corresponding to one DCI format, where the specific mapping relationship may be: the antenna port configuration information includes one type, and therefore the mapping relationship may be a one-to-one or one-to-many mapping relationship; or the antenna port configuration information may include at least two types, and therefore the mapping relationship may be a many-to-one or many-to-many mapping relationship. Specifically, assuming that control information in the D-PDCCH corresponding to one DCI format is divided into two parts, where the first part includes resource allocation control information, and the second part includes control information except the resource allocation control information (other dividing methods are not limited), the first part of control information may correspond to codeword 1, and the second part of control information may correspond to codeword 2. Further, codeword 1 corresponds to antenna port 7, and codeword 2 corresponds to antenna port 8. The UE detects corresponding codeword 1 and codeword 2 on antenna ports 7 and 8 respectively, obtains the two parts of control information by decoding, and forms a piece of complete DCI by using the two parts of control information. With respect to this case, uplink acknowledgement/negative acknowledgement (ACK/NACK, ACKnowledge/Non-ACKnowledge) is designed specially.

Specifically, it is assumed that the D-PDCCH corresponding to one DCI format uses two codewords (codeword 0 and codeword 1) for transmission, where the two codewords may correspond to an ACK/NACK (ACK/NACK0 and ACK/NACK1) respectively. A specific mapping method may be configuring by using explicit signaling or mapping by using an implicit rule. A mapping method is that an ACK/NACK resource is mapped by using a control channel element (which may be a CCE, an RB, or an RB pair) number and an antenna port number, or a control channel element number and a codeword number, for example, an ACK/NACK0 resource corresponds to a control channel element number and antenna port number 7 (corresponding to codeword 0) of the D-PDCCH, and an ACK/NACK1 resource corresponds to a control channel element number and antenna port number 8 (corresponding to codeword 1) of the D-PDCCH. One ACK/NACK (such as ACK/NACK0 corresponding to a minimum antenna number or codeword number occupied by the D-PDCCH) corresponds to the feedback of the PDSCH scheduled by the D-PDCCH, that is, if both two codewords of the D-PDCCH are decoded correctly, correct decoding and incorrect decoding of the PDSCH correspond to ACK and NACK feedback of the ACK/NACK0 respectively, and the ACK/NACK1 is not transmitted in this case. Another ACK/NACK (ACK/NACK1) corresponds to the feedback of the D-PDCCH itself. One manner is that if codeword 0 corresponding to the D-PDCCH is decoded correctly but codeword 1 is decoded incorrectly, the ACK/NACK1 is an ACK; if codeword 1 corresponding to the D-PDCCH is decoded correctly but codeword 0 is decoded incorrectly, the ACK/NACK1 is a NACK, and vice versa. Particularly, if both the two codewords of the D-PDCCH are decoded incorrectly, the UE does not transmit the ACK/NACK0 and ACK/NACK1. In this method, if a part of codewords of a D-PDCCH are transmitted correctly, only the other part of codewords that are transmitted incorrectly need to be retransmitted, which improves the retransmission efficiency and improves the performance of the D-PDCCH.

For another example, a downlink scheduling grant (DL_grant) and an uplink scheduling grant (UL_grant) respectively correspond to different antenna port configuration information, for example, correspond to different codeword numbers.

It should be noted that the mapping relationships involved in the A, B, C, and D may be obtained through broadcast signaling, or RRC dedicated signaling, or MAC layer signaling, or physical layer signaling, where the physical layer signaling may be a PDCCH.

It should be noted that the method shown in FIG. 3 may further include: obtaining, by the UE, an aggregation level corresponding to the D-PDCCH and the count of detections of a candidate D-PDCCH corresponding to the aggregation level. In this way, when the UE detects the D-PDCCH in the search space according to the antenna port configuration information, if the count of detections is reached, the detection is stopped. That is, the detecting the D-PDCCH in the search space includes: detecting the D-PDCCH in the search space according to the obtained aggregation level corresponding to the D-PDCCH and the count of detections of the candidate D-PDCCH corresponding to the aggregation level.

The aggregation level of the D-PDCCH may include 1, 2, 4, and 8 basic units of the control channel, where the basic unit of the control channel may be a CCE, an RB, or an RB pair. The count of searches of the candidate D-PDCCH corresponding to the four aggregation levels 1, 2, 4, and 8 may be 6, 6, 2, and 2 respectively, that is, the setting in the existing system is inherited. Or the aggregation levels in each antenna port configuration and the corresponding information about the count of detections of the candidate D-PDCCH may be configured for the UE through the signaling transmitted by the eNB, where the signaling may be RRC dedicated signaling or physical layer signaling (such as a PDCCH).

Specifically, when the UE detects an antenna port (such as port 7), the UE further needs to blindly detect different aggregation levels. To ensure that the count of blind detections by the UE is not greater than that in the existing system (for example, in the existing system, if two DCI formats are detected, the total count of blind detections does not exceed 32), the count of searches of the candidate D-PDCCH corresponding to the aggregation level and/or each aggregation level may be limited. In a possible embodiment, the UE needs to detect two antenna port configurations, that is, ports {7} and {8}. In this case, for each DCI format, the number of aggregation levels to be detected may be limited to three. For example, for the DCI format having a light payload (for example, scheduling information transmitted by a single codeword bearing a single carrier, specifically as shown in DCI formats 0 and 1A), three aggregation levels 1, 2, and 4 using an RB as a unit may be detected, and the count of searches of the candidate D-PDCCH corresponding to each aggregation level may be limited to 4, 2, and 2. For a DCI format having a heavy payload (for example, scheduling information bearing multiple carriers or transmitted by multiple codewords, specifically as shown in DCI format 2C), three aggregation levels 1, 2, and 4 using an RB as a unit may be detected, and the count of searches of the candidate D-PDCCH corresponding to each aggregation level may be limited to 4, 2, and 2. Therefore, the total count of blind detections by the UE is 2 antenna port configurations*2 DCI formats*(4+2+2)=32, which is not greater than the count of blind detections by the UE in the existing system. Other limiting methods are not restricted.

Particularly, in another possible case, because a rate matching module after the payload of a D-PDCCH is encoded uses a circular buffer (circular buffer) mechanism, in the case of some payload sizes of the D-PDCCH, when a high aggregation level of the control channel is used to transmit the D-PDCCH (using the aggregation level of two RBs as an example, assuming that the RBs forming the D-PDCCH are RB1 and RB2, and that the mapping rule of an ACK/NACK uses the first RB, that is, an ACK/NACK channel implicitly corresponding to RB1), and the search space of the aggregation level of one RB and the search space of the aggregation level of two RBs overlap, the UE may also correctly detect the D-PDCCH by using RB2 of one aggregation level. However, in this case, the UE feeds back the ACK/NACK by using the ACK/NACK channel implicitly corresponding to RB2, and the eNB detects the ACK/NACK on the ACK/NACK channel implicitly corresponding to RB1. As a result, an ACK/NACK channel detection error and collision may occur. An extensible case is that the UE needs to blindly detect multiple antenna port configurations, for example, detect two antenna port configurations, and specifically a single antenna port 8 and two antenna ports 7 and 8, where the resources detected in the two configurations overlap, for example, search spaces overlap. In this case, in the case of some fixed payload sizes of the D-PDCCH, when two antenna ports 7 and 8 are used to transmit the D-PDCCH (assuming that an ACK/NACK corresponds to antenna port 7 of a small number), the UE may also correctly detect the D-PDCCH by detecting the D-PDCCH by using a single antenna port 8, and the UE uses the ACK/NACK channel corresponding to port 8 to feed back the ACK/NACK, while the eNB detects the ACK/NACK on the ACK/NACK channel corresponding to port 7. As a result, a detection error and collision of the ACK/NACK channel may occur.

A solution to the above problem is: once the eNB and the UE find the case of a specific payload size of the D-PDCCH, for example, the case where the payload size of the D-PDCCH is 24 or 26 (excluding a CRC bit), the eNB and the UE add 1 bit to the payload size of the D-PDCCH, so as to implement transmission and reception of the D-PDCCH. For example, 1 bit is added to the D-PDCCH with the payload size 24 so that the payload size is 25, and 1 bit is added to the D-PDCCH with the payload size 26 so that the payload size is 27, thereby avoiding occurrence of the specific payload.

In the above solution, the D-PDCCH is a DL_grant. The solution may also be similarly extended to the case where the D-PDCCH is a UL_grant. Specifically, for the UL_grant of a specific fixed payload size, 1 bit also needs to be added to the payload size to avoid the collision of a PHICH channel (the PHICH is used to transmit a downlink ACK/NACK), because a PHICH channel resource has a mapping relationship with an RB or an RB pair or an antenna port occupied by the D-PDCCH of the UL_grant.

The solution for the D-PDCCH of the specific payload size may be directly applied to the embodiment shown in FIG. 3 or the above embodiments.

With the method provided by the embodiment of the present invention, a UE can detect a D-PDCCH, and therefore data transmission is ensured. Furthermore, a blind detection of a PDCCH by the UE based on time-frequency resources in an existing system is extended to a spatial dimension, that is, an antenna port, thereby increasing the efficiency of resource utilization, so that the D-PDCCH can be detected in the spatial dimension. In this way, a D-PDCCH detection method is provided, the flexibility of scheduling of the D-PDCCH in MU-MIMO is improved, and the reception performance of the PDCCH is improved; in addition, it is ensured that the count of blind detections by the UE is not greater than that in the existing system, that is, the implementation complexity of the UE is not increased.

Figure 4:
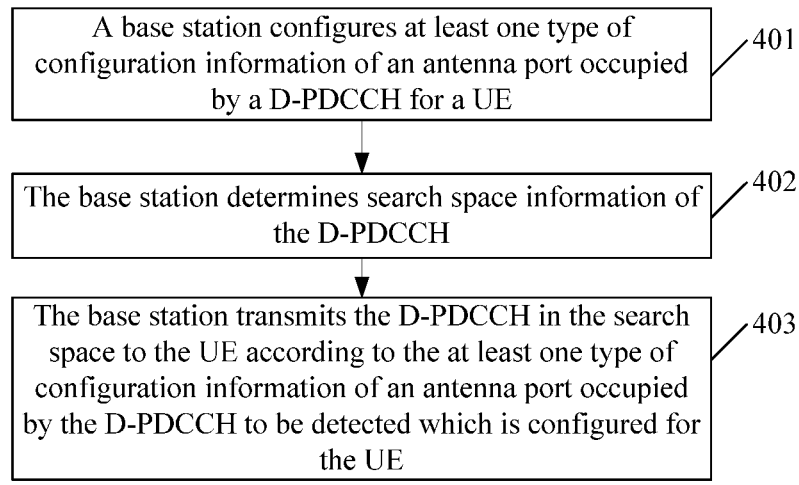
FIG. 4 is a flowchart of another method for detecting information according to an embodiment of the present invention.

An embodiment of the present invention further provides another method for detecting information. Referring to FIG. 4, the method is used on a base station side, and the method may include:

Step 401: A base station configures at least one type of antenna port configuration information occupied by a D-PDCCH for a UE.

Step 402: The base station determines search space information of the D-PDCCH, where the search space indicates at least one position of the D-PDCCH in time-frequency resources.

Step 403: The base station transmits the D-PDCCH in the search space to the UE according to the at least one type of configuration information of an antenna port occupied by the D-PDCCH to be detected which is configured for the UE.

The base station further obtains a mapping relationship between the antenna port configuration information and second information, and configures the obtained mapping relationship for the UE.

The mapping relationship between the antenna port configuration information and second information includes any one or any combination of the following mapping relationships:

a mapping relationship between the antenna port configuration information and a DCI format used by the D-PDCCH;

a mapping relationship between the antenna port configuration information and an aggregation level of the D-PDCCH;

a mapping relationship between the antenna port configuration information and resources occupied by the D-PDCCH; and a mapping relationship between the antenna port configuration information and scheduling information of each carrier borne in the D-PDCCH.

The antenna port configuration information includes one type, and the mapping relationship is a one-to-one or one-to-many mapping relationship; or the antenna port configuration information includes at least two types, and the mapping relationship is a many-to-one or many-to-many mapping relationship.

The foregoing method may further include:

configuring, by the base station, an aggregation level corresponding to the D-PDCCH and a count of detections of a candidate D-PDCCH corresponding to the aggregation level for the UE, so that the UE detects the D-PDCCH in the search space according to the obtained aggregation level corresponding to the D-PDCCH and the count of detections of the candidate D-PDCCH corresponding to the aggregation level.

With the method provided by the embodiment of the present invention, a UE can detect a D-PDCCH, and therefore data transmission is ensured. Furthermore, a blind detection of a PDCCH by the UE based on time-frequency resources in an existing system is extended to a spatial dimension, that is, an antenna port, thereby increasing the efficiency of resource utilization, so that the D-PDCCH can be detected in the spatial dimension. In this way, a D-PDCCH detection method is provided, the flexibility of scheduling of the D-PDCCH in MU-MIMO is improved, and the reception performance of the PDCCH is improved; in addition, it is ensured that the count of blind detections by the UE is not greater than that in the existing system, that is, the implementation complexity of the UE is not increased.

Figure 5:
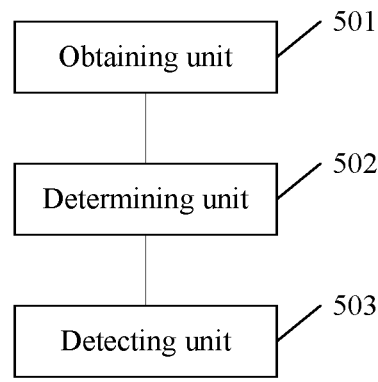
FIG. 5 is a schematic structural diagram of a UE according to an embodiment of the present invention.

An embodiment of the present invention further provides a user equipment. Referring to FIG. 5, the user equipment specifically includes:

an obtaining unit 501, adapted to obtain at least one type of configuration information of an antenna port occupied by a D-PDCCH, which is configured on a base station side;

a determining unit 502, adapted to determine a search space of the D-PDCCH, where the search space indicates a position to be detected, of at least one candidate D-PDCCH of the D-PDCCH in time-frequency resources; and a detecting unit 503, adapted to detect the D-PDCCH in the search space according to the antenna port configuration information.

For the user equipment shown in FIG. 5:

the obtaining unit 501 is further adapted to obtain a mapping relationship between the antenna port configuration information and second information;

the detecting unit 503 is further adapted to detect the D-PDCCH in the search space according to the antenna port configuration information and the mapping relationship; and the mapping relationship between the antenna port configuration information and second information includes any one or any combination of the following mapping relationships:

a mapping relationship between the antenna port configuration information and a DCI format used by the D-PDCCH;

a mapping relationship between the antenna port configuration information and an aggregation level of the D-PDCCH;

a mapping relationship between the antenna port configuration information and resources occupied by the D-PDCCH; and a mapping relationship between the antenna port configuration information and scheduling information of each carrier borne in the D-PDCCH.

The antenna port configuration information includes one type, and the mapping relationship is a one-to-one or one-to-many mapping relationship; or the antenna port configuration information includes at least two types, and the mapping relationship is a many-to-one or many-to-many mapping relationship.

The antenna port configuration information includes at least antenna port information, and scrambling code ID information and codeword information of a UE-specific reference signal corresponding to an antenna port; the antenna port configuration information further includes one or any combination of the following: a length of an orthogonal spreading code of the UE-specific reference signal corresponding to an antenna port, and a mapping relationship between antenna port information and codeword information.

For the user equipment shown in FIG. 5:

the obtaining unit 501 is further adapted to obtain an aggregation level corresponding to the D-PDCCH and the count of detections of a candidate D-PDCCH corresponding to the aggregation level; and the detecting unit 503 is further adapted to detect the D-PDCCH in the search space according to the obtained aggregation level corresponding to the D-PDCCH and the count of detections of the candidate D-PDCCH corresponding to the aggregation level.

With the terminal provided by the embodiment of the present invention, a UE can detect a D-PDCCH, and therefore data transmission is ensured. Furthermore, a blind detection of a PDCCH by the UE based on time-frequency resources in an existing system is extended to a spatial dimension, that is, an antenna port, thereby increasing the efficiency of resource utilization, so that the D-PDCCH can be detected in the spatial dimension. In this way, a D-PDCCH detection method is provided, the flexibility of scheduling of the D-PDCCH in MU-MIMO is improved, and the reception performance of the PDCCH is improved; in addition, it is ensured that the count of blind detections by the UE is not greater than that in the existing system, that is, the implementation complexity of the UE is not increased.

Figure 6:
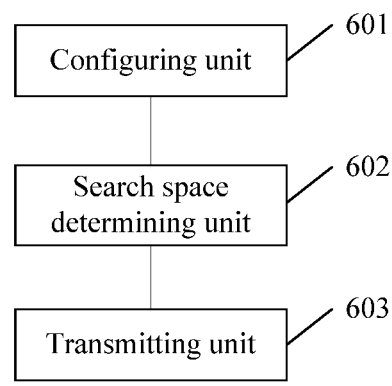
FIG. 6 is a schematic structural diagram of a base station according to an embodiment of the present invention.

An embodiment of the present invention further provides a base station. Referring to FIG. 6, the base station specifically includes:

a configuring unit 601, adapted to configure at least one type of configuration information of an antenna port occupied by a D-PDCCH for a UE;

a search space determining unit 602, adapted to determine search space information of the D-PDCCH; and a transmitting unit 603, adapted to transmit the D-PDCCH in the search space to the UE according to the at least one type of antenna port configuration information occupied by the D-PDCCH which is configured for the UE.

In another possible embodiment, in addition to the configuring unit 701, search space determining unit 702, and transmitting unit 703, the base station may further include:

an obtaining unit 704, adapted to obtain a mapping relationship between the antenna port configuration information and second information, where the transmitting unit 703 is further adapted to configure the obtained mapping relationship for the UE; and the mapping relationship between the antenna port configuration information and second information includes any one or any combination of the following mapping relationships:

a mapping relationship between the antenna port configuration information and a DCI format used by the D-PDCCH;

a mapping relationship between the antenna port configuration information and an aggregation level of the D-PDCCH;

a mapping relationship between the antenna port configuration information and resources occupied by the D-PDCCH; and a mapping relationship between the antenna port configuration information and scheduling information of each carrier borne in the D-PDCCH.

The antenna port configuration information configured by the first configuring unit includes one type, and the mapping relationship obtained by the obtaining unit is a one-to-one or one-to-many mapping relationship;

or the antenna port configuration information configured by the first configuring unit includes at least two types, and the mapping relationship obtained by the obtaining unit is a many-to-one or many-to-many mapping relationship.

Figure 7:
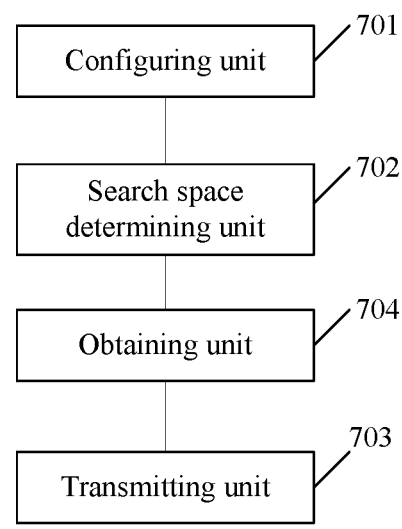
FIG. 7 is a schematic structural diagram of another base station according to an embodiment of the present invention.

For the base station in FIG. 6 and FIG. 7, the configuring unit is further adapted to configure an aggregation level corresponding to the D-PDCCH and a count of detections of a candidate D-PDCCH corresponding to the aggregation level for the UE, so that the UE detects the D-PDCCH in the search space according to the obtained aggregation level corresponding to the D-PDCCH and the count of detections of the candidate D-PDCCH corresponding to the aggregation level.

With the base station provided by the embodiment of the present invention, a UE can detect a D-PDCCH, and therefore data transmission is ensured. Furthermore, a blind detection of a PDCCH by the UE based on time-frequency resources in an existing system is extended to a spatial dimension, that is, an antenna port, thereby increasing the efficiency of resource utilization, so that the D-PDCCH can be detected in the spatial dimension. In this way, a D-PDCCH detection method is provided, the flexibility of scheduling of the D-PDCCH in MU-MIMO is improved, and the reception performance of the PDCCH is improved; in addition, it is ensured that the count of blind detections by the UE is not greater than that in the existing system, that is, the implementation complexity of the UE is not increased.

The embodiments of the UE terminal and base station side are described briefly because the embodiments of the UE terminal and base station side are basically similar to the method embodiments. Therefore, for related information, reference may be made to the part of the description of the method embodiments.

Embodiment 2

As can be known from the above description, in an existing LTE system, a subframe is a smallest time unit scheduled by an eNB, each subframe includes two timeslots, and each timeslot includes seven symbols. For a UE scheduled in a subframe, the subframe includes a physical downlink control channel (PDCCH) of the UE. The PDCCH is dispersed to the whole system bandwidth in a frequency domain through interleaving processing. In a time domain, the PDCCH is borne in first n symbols of the subframe, where n may be one of 1, 2, and 3, or one of 2, 3, and 4 (in a case where the system bandwidth is 1.4 MHz). Specifically, the PDCCH is notified by two bits borne in a PCFICH, where the n symbols indicate a control channel region. A downlink data channel PDSCH may be scheduled by the PDCCH, and the PDCCH and the scheduled PDSCH are in the same subframe. The PDCCH occupies the first several symbols, and the PDSCH occupies the following several symbols.

When the UE performs a detection, the UE first detects a physical control format indicator channel (PCFICH, Physical Control Format Indicator Channel), and learns which several symbols the PDCCH occupies, and then detects the PDCCH, and correspondingly receives, according to scheduling information in the PDCCH, the PDSCH scheduled by the PDCCH. As can be seen from the prior art, when a PCFICH detection error occurs, it is impossible that the UE can detect its own PDCCH; conversely, when the UE detects its own PDCCH successfully, it indicates that the PCFICH is definitely detected correctly. This process may mean that the PDCCH detection by the UE is a verification of the PCFICH detection.

In an LTE system of a later release, technologies such as carrier aggregation, multi-user MIMO, and CoMP will be introduced. In addition, a heterogeneous network scenario will be widely applied. All these will lead to a capacity limitation on the PDCCH. Therefore, a PDCCH based on channel information precoding will be introduced. This PDCCH will be demodulated based on a UE-specific reference signal, and the UE-specific reference signal may also be referred to as a dedicated reference signal (DRS). Therefore, the PDCCH demodulated based on the DRS is hereinafter briefed as a D-PDCCH. Because D-PDCCH resources are located in a PDSCH region, and the D-PDCCH and the PDSCH scheduled by the D-PDCCH are divided by frequencies. An encountered problem is how to determine a time-domain start symbol of the D-PDCCH and a time-domain start symbol of the PDSCH scheduled by the D-PDCCH.

At present, a solution is that, for a simple implementation, in the first timeslot of a subframe, the UE receives the D-PDCCH based on the fixed time-domain start symbol, for example, the maximum value of the PCFICH, and further receives the D-PDCCH behind the control channel region. Next, the UE receives the PDSCH according to scheduling information in the received D-PDCCH, in the same subframe, that is, the subframe where the D-PDCCH is located. The time-domain start symbol of the PDSCH may be obtained by the detection of the PCFICH. Specifically, according to the detection of the PCFICH, if it is determined that the control channel region is n symbols, the UE receives the PDSCH from the $(n+1)^{th}$ symbol. The problem is: if a PCFICH detection error occurs, and the D-PDCCH is received correctly, the UE incorrectly finds the start point of the PDSCH, resulting in a detection error of the PDSCH; further, due to the error of the start point of data, the data cannot be recovered by a subsequent retransmission combination mechanism, finally resulting in loss of the PDSCH data packet at the physical layer.

In view of the above technical problem, Embodiment 2 of the present invention provides a method for receiving information, so as to solve the problem of incorrectly finding the start point of the PDSCH resulting from a PCFICH detection error, thereby improving the transmission efficiency of the system.

A method for receiving a PDSCH includes:

in a first timeslot of a subframe, receiving, by a UE, a D-PDCCH by using symbol m as a time-domain start symbol; and receiving, by the UE according to downlink scheduling information borne in the D-PDCCH and by using symbol n as a time-domain start symbol, a PDSCH scheduled by the D-PDCCH.

The D-PDCCH and the PDSCH are on a same carrier.

The value of the symbol m is predefined, or notified through broadcast signaling or RRC dedicated signaling or physical layer signaling, where the physical layer signaling is a PDCCH.

Preferably, for the system bandwidth except the system bandwidth 1.4 MHz, the time-domain start symbol of the D-PDCCH in the first timeslot of a subframe may be a predefined fourth symbol. Based on the assumption, optionally, if the value of the PCFICH is 1 or 2, the second and third symbols in the frequency-domain resource positions of the D-PDCCH are idle, or the third symbol is idle. In this case, the idle symbols may be used to bear other information, for example, PHICH resources.

The value of the n is predefined, or notified through RRC dedicated signaling or MAC layer signaling or physical layer signaling, where the physical layer signaling is specifically the D-PDCCH or other PDCCHs, for example, another PDCCH indicating the D-PDCCH information.

Optionally, a bit or CRC mask in the D-PDCCH is used to notify the time-domain start symbol of the PDSCH scheduled by the D-PDCCH, for example, 2 bits may indicate that the PDSCH starts from the second, third, fourth, or fifth symbol.

Optionally, the RRC dedicated signaling is used to configure the time-domain start symbol of the PDSCH scheduled by the D-PDCCH.

Optionally, a first-level PDCCH is used to notify the time-domain start symbol of the PDSCH scheduled by the D-PDCCH. The first-level PDCCH is used to notify information such as resources of the D-PDCCH.

A specific example is as follows:

Assuming that the downlink system bandwidth is not 1.4 MHz, the control channel region occupies at most three symbols. For a simple implementation, the start time-domain symbol of the D-PDCCH may be a predefined fourth symbol, or may be configured through broadcast signaling or RRC signaling or MAC layer signaling or physical layer signaling (such as a PDCCH). Therefore, the UE receives the D-PDCCH according to the start symbol of the D-PDCCH, and receives, according to downlink scheduling information borne in the D-PDCCH, the PDSCH scheduled by the D-PDCCH. When receiving the PDSCH, to avoid the impact caused by the PCFICH detection error, the UE cannot determine the time-domain start symbol of the PDSCH according to the quantity of control channel region symbols obtained by detecting the PCFICH, but receives the PDSCH through the predefined start symbol of the PDSCH (such as the fourth symbol), or through the start symbol of the PDSCH notified by broadcast signaling or RRC signaling or MAC layer signaling or physical layer signaling (such as another PDCCH indicating the D-PDCCH information, or the D-PDCCH).

With the above method for receiving information, the problem that the start point of the PDSCH is incorrectly detected due to a PCFICH detection error is solved, and the transmission efficiency of the system is improved.

An embodiment of this application further provides a method for transmitting a PDSCH, including:

in a first timeslot of a subframe, transmitting, by an eNB, a D-PDCCH to a UE by using symbol m as a time-domain start symbol, where the D-PDCCH indicates a time-domain start symbol of a PDSCH scheduled by the D-PDCCH, so that the UE detects, according to downlink scheduling information borne in the D-PDCCH and the time-domain start symbol information, the PDSCH scheduled by the D-PDCCH.

The time-domain start symbol information of the PDSCH may be further notified to the UE through broadcast signaling or RRC signaling or MAC layer signaling or physical layer signaling (such as another PDCCH indicating the D-PDCCH information) transmitted by the eNB.

With the above method for transmitting information, the problem that the start point of the PDSCH is incorrectly detected due to a PCFICH detection error is solved, and the transmission efficiency of the system is improved.

Embodiment 3

A D-PDCCH uses an RB as a basic unit of an aggregation level, and therefore 14 symbols in a subframe are an RB pair from the perspective of the frequency domain. The quantity of time-domain symbols occupied by two RBs of two timeslots in an RB pair is 7, but the quantity of remaining symbols that can transmit the D-PDCCH, after the quantity of symbols occupied by a control region is subtracted from the first timeslot, is smaller than 7. If the control region occupies 3 symbols, only 4 symbols in the first timeslot may be used to transmit the D-PDCCH. Therefore, compared with 7 symbols in the second timeslot, D-PDCCH information transmitted in each RB is not equalized.

Based on the above technical problem, an embodiment of the present invention provides a method for transmitting control information, so as to solve the problem that the quantities of symbols in two timeslots in an RB pair are not equalized and equalize the performance of the D-PDCCH.

A method for transmitting control information specifically includes:

in a subframe, respectively transmitting, by an eNB on two RBs in an RB pair, two D-PDCCHs to one or two UEs, where one D-PDCCH occupies 6 symbols in the second timeslot of the subframe, and the other D-PDCCH occupies 4 symbols or 7-n symbols in the first timeslot of the subframe, where the n is the quantity of symbols occupied by a control region.

An embodiment of the present invention further provides a method for receiving control information, specifically including:

in a subframe, detecting, by a UE on two RBs in an RB pair, D-PDCCHs transmitted by an eNB, where 6 symbols in the second timeslot of the subframe are used as a unit to detect a D-PDCCH, and 4 symbols or 7-n symbols in the first timeslot of the subframe are used as a unit to detect a D-PDCCH, where the n is the quantity of symbols occupied by a control region.

With the above transmitting and receiving methods, the problem that the quantities of symbols in two timeslots in an RB pair are not equalized during D-PDCCH transmission is solved, and the performance of the D-PDCCH is equalized.

Embodiment 4

Background

In an LTE system of the existing release, a physical downlink control channel (PDCCH, Physical Downlink Control Channel) bears control information of uplink and downlink data channels. Specifically, a PDCCH scheduling a downlink data channel is called a downlink scheduling grant (DL_grant, Downlink_grant), and a PDCCH scheduling an uplink data channel is called an uplink scheduling grant (UL_grant, Uplink_grant). The PDCCH has many downlink control information (DCI, Downlink Control Information) formats, for example, DCI formats 0, 1A, 1, 2, 2A, 2C, and 4. The PDCCH corresponding to DCI formats 0 and 4 is an uplink scheduling grant, and the PDCCH corresponding to other several DCI formats is a downlink scheduling grant. Different DCI formats may have different payload sizes (payload sizes). The payload of the PDCCH includes an information bit, a padding bit, and a cyclic redundancy check (CRC, Cyclic Redundancy Check) bit, where the information bit is a specific control information bit field in the DCI, and is specifically related to a carrier bandwidth and a duplex mode. The total quantity of bits included in the payload is a payload size. Payload sizes of different DCI formats may also be equal. For example, DCI formats 0 and 1A are distinguished by a header bit respectively included in the two DCI formats. If the quantity of information bits in one DCI format is smaller than that in another DCI format, bits need to be padded in the smaller DCI format so that payload sizes of the two DCI formats are equal.

In an LTE system of an evolved release, an uplink discontinuous transmission mechanism is introduced. How to design uplink DCI format 0 to support the new feature is a problem to be solved by the present invention.

Specific implementation manners of Embodiment 4:

Implementation Manner 1

A method for transmitting control signaling specifically includes:

determining, by a network-side device according to uplink and downlink bandwidths, a duplex mode of a system, and the quantity of downlink carriers configured for a UE, that DCI format 0 of the UE includes a resource allocation type indicator bit; and transmitting, by the network-side device, a PDCCH corresponding to the DCI format 0 to the user equipment (UE, User Equipment), so that the user equipment (UE, User Equipment) determines a resource allocation type of an uplink data channel according to the value of the resource allocation type indicator bit in the DCI format 0.

The uplink bandwidth is equal to the downlink bandwidth, and the duplex mode of the system is frequency division duplex (FDD, Frequency Division Duplexing), and the quantity of downlink carriers configured for the UE is 1. In other words, when the uplink bandwidth is equal to the downlink bandwidth, and the duplex mode of the system is FDD, if the quantity of downlink carriers configured for the UE is greater than 1, the DCI format 0 of the UE does not include the resource allocation type indicator bit.

A method for receiving control signaling specifically includes:

determining, by a user equipment (UE, User Equipment) according to uplink and downlink bandwidths, a duplex mode of a system, and the quantity of downlink carriers configured for the UE, that DCI format 0 of the UE includes a resource allocation type indicator bit; and detecting, by the UE, a PDCCH corresponding to the DCI format 0, and determining a resource allocation type of an uplink data channel according to the value of the resource allocation type indicator bit in the detected DCI format 0.

The uplink bandwidth is equal to the downlink bandwidth, and the duplex mode of the system is frequency division duplex (FDD, Frequency Division Duplexing), and the quantity of downlink carriers configured for the UE is 1. In other words, when the uplink bandwidth is equal to the downlink bandwidth, and the duplex mode of the system is FDD, if the quantity of downlink carriers configured for the UE is greater than 1, the DCI format 0 of the UE does not include the resource allocation type indicator bit.

A network-side device specifically includes:

a determining module, adapted for the network-side device to determine, according to uplink and downlink bandwidths, a duplex mode of a system, and the quantity of downlink carriers configured for a UE, that DCI format 0 of the UE includes a resource allocation type indicator bit; and a transmitting module, adapted for the network-side device to transmit a PDCCH corresponding to the DCI format 0 to the user equipment (UE, User Equipment).

The uplink bandwidth is equal to the downlink bandwidth, and the duplex mode of the system is frequency division duplex (FDD, Frequency Division Duplexing), and the quantity of downlink carriers configured for the UE is 1. In other words, when the uplink bandwidth is equal to the downlink bandwidth, and the duplex mode of the system is FDD, if the quantity of downlink carriers configured for the UE is greater than 1, the DCI format 0 of the UE does not include the resource allocation type indicator bit.

A UE specifically includes:

a determining module, adapted for the UE to determine, according to uplink and downlink bandwidths, a duplex mode of a system, and the quantity of downlink carriers configured for the UE, that DCI format 0 of the UE includes a resource allocation type indicator bit; and a detecting module, adapted for the UE to detect a PDCCH corresponding to the DCI format 0.

The uplink bandwidth is equal to the downlink bandwidth, and the duplex mode of the system is frequency division duplex (FDD, Frequency Division Duplexing), and the quantity of downlink carriers configured for the UE is 1.

In other words, when the uplink bandwidth is equal to the downlink bandwidth, and the duplex mode of the system is FDD, if the quantity of downlink carriers configured for the UE is greater than 1, the DCI format 0 of the UE does not include the resource allocation type indicator bit.

Specifically, when the uplink bandwidth is equal to the downlink bandwidth in the FDD system, and the quantity of downlink carriers configured for the UE is 1, the quantity of information bits (except the resource allocation type indicator bit) in DCI format 0 is 1 smaller than the quantity of information bits in DCI format 1A. If the resource allocation type indicator bit is not considered, a bit needs to be padded in DCI format 0 so that final payload sizes of the two DCI formats are equal. Therefore, DCI format 0 may include a resource allocation type indicator bit. In this case, the payload size of DCI format 0 is the same as that in the above situation where the resource allocation type indicator bit is not included, which means that the resource allocation type indicator bit occupies the position of the padding bit. Therefore, the implementation is simple, and the introduction of the resource allocation type indicator bit does not cause a change to the payload sizes of DCI formats 0 and 1A. Conversely, if the uplink bandwidth is equal to the downlink bandwidth in the FDD system, and the quantity of downlink carriers configured for the UE is greater than 1, an aperiodic channel state information trigger bit is added to DCI format 0. Therefore, the quantity of information bits in DCI format 0 is equal to the quantity of information bits in DCI format 1A. If the resource allocation type indicator bit is added to DCI format 0 at this time, bit padding needs to be performed in DCI format 1A. Consequently, the final payload sizes of the two DCI formats change as compared with those before the resource allocation type indicator bit is added, and the implementation is complex. Therefore, in this case, DCI format 0 does not include the resource allocation type indicator bit.

Specifically, for example, assuming that in the FDD system, the uplink bandwidth and downlink bandwidth are both 20 MHz, if the quantity of information bits in DCI format 0 is 27 and the quantity of information bits in DCI format 1A is 28 when the quantity of downlink carriers configured for the UE is 1, if addition of a resource allocation type indicator bit is not considered, a bit needs to be padded in DCI format 0, so that final payload sizes of the two DCI formats are equal. Therefore, if a resource allocation type indicator bit is added, which means that the position of the padding bit is occupied, final payload sizes of the two DCI formats do not change as compared with those before the resource allocation type indicator bit is added, and the implementation is simple. If the quantity of downlink carriers configured for the UE is greater than 1, the quantity of information bits in DCI format 0 is 28, which includes 1 more aperiodic channel state information trigger bit than that in the downlink single carrier, and the quantity of information bits in DCI format 1A is still 28. If addition of a resource allocation type indicator bit is not considered, bit padding is not required for both the two DCI formats, so that the final payload sizes of the two DCI formats are equal. In this case, if a resource allocation type indicator bit is added to DCI format 0, the quantity of information bits in DCI format 0 changes to 29, and correspondingly, bit padding needs to be performed in DCI format 1A. Consequently, the final payload sizes of the two DCI formats change as compared with those before the resource allocation type indicator bit is added, and the implementation is complex. Therefore, in this case, DCI format 0 does not include the resource allocation type indicator bit.

The above solution ensures that the payload size of DCI format 0 does not change after the resource allocation type indicator bit is added to DCI format 0, and it is easy to implement the solution.

Implementation Manner 2

A method for transmitting control signaling specifically includes:

determining, by a network-side device according to uplink and downlink bandwidths and a duplex mode of a system, information bits except a resource allocation type indicator bit in DCI format 0;

determining, by the network-side device, a set using bit quantities as elements, where the set is {12, 14, 16, 20, 24, 26, 32, 40, 44, 56};

if the total quantity of information bits except the resource allocation type indicator bit in the DCI format 0 is equal to any bit quantity in the set, determining, by the network-side device, that the DCI format 0 includes the resource allocation type indicator bit; and transmitting, by the network-side device, a PDCCH corresponding to the DCI format 0 to a user equipment (UE, User Equipment), so that the user equipment (UE, User Equipment) determines a resource allocation type of an uplink data channel according to the value of the resource allocation type indicator bit in the DCI format 0.

The above method further includes: when the uplink bandwidth is equal to the downlink bandwidth, and the duplex mode of the system is FDD, and the quantity of downlink carriers configured for the UE is greater than 1, if the total quantity of information bits except the resource allocation type indicator bit in the DCI format 0 is equal to any bit quantity in the set, including, by the DCI format 0, the resource allocation type indicator bit; and if the total quantity of information bits except the resource allocation type indicator bit in the DCI format 0 is not equal to any bit quantity in the set, not including, by the DCI format 0, the resource allocation type indicator bit.

A method for receiving control signaling specifically includes:

determining, by a UE according to uplink and downlink bandwidths and a duplex mode of a system, information bits except a resource allocation type indicator bit in DCI format 0;

determining, by the UE, a set using bit quantities as elements, where the set is {12, 14, 16, 20, 24, 26, 32, 40, 44, 56};

if the total quantity of information bits except the resource allocation type indicator bit in the DCI format 0 is equal to any bit quantity in the set, determining, by the UE, that the DCI format 0 includes the resource allocation type indicator bit; and detecting, by the UE, a PDCCH corresponding to the DCI format 0, and determining a resource allocation type of an uplink data channel according to the value of the resource allocation type indicator bit in the detected DCI format 0.

The above method further includes: when the uplink bandwidth is equal to the downlink bandwidth, and the duplex mode of the system is FDD, and the quantity of downlink carriers configured for the UE is greater than 1, if the total quantity of information bits except the resource allocation type indicator bit in the DCI format 0 is equal to any bit quantity in the set, including, by the DCI format 0, the resource allocation type indicator bit; and if the total quantity of information bits except the resource allocation type indicator bit in the DCI format 0 is not equal to any bit quantity in the set, not including, by the DCI format 0, the resource allocation type indicator bit.

A network-side device specifically includes:

a first determining module, adapted for the network-side device to determine, according to uplink and downlink bandwidths and a duplex mode of a system, information bits except a resource allocation type indicator bit in DCI format 0;

a second determining module, adapted for the network-side device to determine a set using bit quantities as elements, where the set is {12, 14, 16, 20, 24, 26, 32, 40, 44, 56};

a judging module, adapted for the network-side device to determine, according to information indicating that the total quantity of information bits except the resource allocation type indicator bit in the DCI format 0 is equal to any bit quantity in the set, that the DCI format 0 includes the resource allocation type indicator bit; and a transmitting module, adapted for the network-side device to transmit a PDCCH corresponding to the DCI format 0 to a user equipment (UE, User Equipment).

The above method further includes: when the uplink bandwidth is equal to the downlink bandwidth, and the duplex mode of the system is FDD, and the quantity of downlink carriers configured for the UE is greater than 1, if the total quantity of information bits except the resource allocation type indicator bit in the DCI format 0 is equal to any bit quantity in the set, including, by the DCI format 0, the resource allocation type indicator bit; and if the total quantity of information bits except the resource allocation type indicator bit in the DCI format 0 is not equal to any bit quantity in the set, not including, by the DCI format 0, the resource allocation type indicator bit.

A UE specifically includes:

a first determining module, adapted for the UE to determine, according to uplink and downlink bandwidths and a duplex mode of a system, information bits except a resource allocation type indicator bit in DCI format 0;

a second determining module, adapted for the UE to determine a set using bit quantities as elements, where the set is {12, 14, 16, 20, 24, 26, 32, 40, 44, 56};

a judging module, adapted for the UE to determine, according to information indicating that the total quantity of information bits except the resource allocation type indicator bit in the DCI format 0 is equal to any bit quantity in the set, that the DCI format 0 includes the resource allocation type indicator bit; and a detecting module, adapted for the UE to detect a PDCCH corresponding to the DCI format 0.

The above method further includes: when the uplink bandwidth is equal to the downlink bandwidth, and the duplex mode of the system is FDD, and the quantity of downlink carriers configured for the UE is greater than 1, if the total quantity of information bits except the resource allocation type indicator bit in the DCI format 0 is equal to any bit quantity in the set, including, by the DCI format 0, the resource allocation type indicator bit; and if the total quantity of information bits except the resource allocation type indicator bit in the DCI format 0 is not equal to any bit quantity in the set, not including, by the DCI format 0, the resource allocation type indicator bit.

The network-side device may be a base station.

The duplex mode may be frequency division duplex (FDD, Frequency Division Duplexing) or time division duplex (TDD, Time Division Duplexing), and the duplex mode has an impact on the information bits in the DCI format. For example, the DCI format in the TDD mode has two more downlink assignment index (DAI, Downlink Assignment Index) information bits than that in the FDD mode; or the DCI format of a downlink scheduling grant in the TDD mode has one more information bit of a hybrid automatic repeat request (HARQ, Hybrid Automatic Repeat Request) process number than that in the FDD mode. The duplex mode of the system is notified by the base station to the UE through broadcast signaling.

The uplink bandwidth also has an impact on the information bits in the DCI format corresponding to an uplink scheduling grant. Specifically the uplink bandwidth affects the size of the resource allocation bit field in the DCI format corresponding to the uplink scheduling grant. Generally, if bandwidth is larger, more bits are allocated for resources. The bandwidth information of the system is notified by the base station to the UE through broadcast signaling.

Further, configuration information of an aperiodic sounding reference signal (ASRS, Aperiodic Sounding Reference Signal) signal also affects information bits in DCI formats 0 and 1A. If the ASRS signal is configured by radio resource control (RRC, Radio Resource Control) signaling of the base station, an ASRS trigger bit exists in both DCI formats 0 and 1A; if the ASRS signal is not configured, the bit does not exist in the two DCI formats.

Further, in the case of carrier aggregation (CA, Carrier Aggregation), that is, in a case where the base station may configure multiple carriers for a UE, the quantity of downlink carriers configured by RRC signaling for the UE also affects information bits in DCI format 0. Specifically, if the UE is not configured with downlink CA, that is, only one downlink carrier exists, the quantity of aperiodic channel state information trigger bits in DCI format 0 is 1; and if the UE is configured with downlink CA, that is, at least two downlink carriers exist, the quantity of aperiodic channel state information trigger bits in DCI format 0 is 2.

Sizes of other bit fields in DCI format 0 do not depend on the uplink bandwidth and duplex mode and even further the configuration information of the aperiodic sounding signal and the quantity of downlink carriers configured for the UE. Therefore, the base station and the UE can determine all information bits except the resource allocation type indicator bit in DCI format 0 according to the uplink bandwidth and duplex mode of the current system and even configuration information of the aperiodic sounding signal and the quantity of downlink carriers configured for the UE.

With respect to existence or nonexistence of the resource allocation type indicator bit, because the payload size of DCI format 0 is not expected to change due to introduction of the information bit, it may be considered that the resource allocation type indicator bit is added when a padding bit exists in DCI format 0. For example, when the quantity of information bits in DCI format 0 is smaller than the quantity of information bits in DCI format 1A, a bit needs to be padded in the DCI format 0 so that final payload sizes of the two DCI formats are equal. In this case, the resource allocation type indicator bit may be added to DCI format 0, and the final payload size of DCI format 0 does not change.

Next, the base station and UE determine a set {12, 14, 16, 20, 24, 26, 32, 40, 44, 56} using bit quantities as elements. Then, if the total quantity of information bits except the resource allocation type indicator bit in the DCI format 0 is equal to any bit quantity in the set, the base station and UE determine that the DCI format 0 includes a resource allocation type indicator bit. The above judging condition may further include three cases. The first case is that when the total quantity of information bits except the resource allocation type indicator bit in the DCI format 0 is smaller than the total quantity of information bits in DCI format 1A, to make the final payload sizes of DCI formats 0 and 1A equal, padding is required in DCI format 0, and therefore, in this case, a resource allocation type indicator bit may be added. The second case is that when the total quantity of information bits except the resource allocation type indicator bit in the DCI format 0 is equal to the total quantity of information bits in DCI format 1A, generally, bit padding is not required in both the DCI formats, but if the total quantity of information bits is any bit quantity in the set at this time, a bit needs to be padded in DCI format 1A of the corresponding downlink scheduling grant to avoid the bit quantities in the set, because if avoidance is not performed, DCI format 1A may be detected correctly by using different aggregation levels. For example, the eNB uses aggregation level 2 to schedule a downlink scheduling grant corresponding to DCI format 1A for the UE. The UE may correctly detect DCI format 1 by using aggregation level 1. As a result, a channel collision of uplink HARQ acknowledgement information corresponding to the downlink data packet may occur. In a case where the quantity of information bits in the DCI format of the uplink scheduling grant is any bit quantity in the set, avoidance is not required, because the channel of downlink HARQ acknowledgement information corresponding to uplink data scheduling has no relationship with the aggregation level. Next, a bit needs to be padded in DCI format 0 again so that the final payload sizes of the two DCI formats are equal. The third case is that when the total quantity of information bits except the resource allocation type indicator bit in the DCI format 0 is greater than the total quantity of information bits in DCI format 1A, to make the final payload sizes of DCI formats 0 and 1A equal, bit padding is required in DCI format 1A so that the quantity of information bits in DCI format 1A is equal to that in DCI format 0. In this case, because the quantity of information bits after padding is a bit quantity in the set again, to avoid this bit quantity, another bit is padded in DCI format 1A. Then, further a bit needs to be padded in DCI format 0 to make the final payload sizes of the two DCI formats equal. For the first and second cases, padding bits finally exist in DCI format 0. Therefore, addition of the resource allocation type indicator bit may be supported.

For the second and third cases, the following examples are used for description:

Example 1

For the FDD system, both uplink bandwidth and downlink bandwidths are 5 MHz. If no ASRS trigger bit is configured, and the downlink adopts CA, both quantities of information bits in DCI formats 0 and 1A are 24, and just fall within the above set. Therefore, a bit is padded in DCI format 1A, and correspondingly, a resource allocation type indicator bit may be added to DCI format 0.

Example 2

For the FDD system, uplink bandwidth is 15 MHz and downlink bandwidth is 10 MHz. If no ASRS trigger bit is configured, and the downlink is configured with only a single carrier, both quantities of information bits in DCI formats 0 and 1A are 26, and just fall within the above set. Therefore, a bit is padded in DCI format 1A, and correspondingly, a resource allocation type indicator bit may be added to DCI format 0.

Example 3

For the TDD system, uplink bandwidth is 5 MHz, and downlink bandwidth is 3 MHz. If no ASRS trigger bit is configured, and the downlink adopts CA, the quantity of information bits in DCI format 0 is 26, and the quantity of information bits in DCI format 1A is 25. Because the quantity of information bits in DCI format 1A is smaller than that in DCI format 0 at this time, a bit needs to be padded in DCI format 1A to change the quantity to 26, but the quantity of information bits in DCI format 1A after padding falls within the above set again. Therefore, a bit is padded again in DCI format 1A to change the quantity to 27, but the quantity of information bits in DCI format 0 is 26, and therefore a resource allocation type indicator bit may be added to DCI format 0.

Finally, the base station or UE performs scheduling or is scheduled through the PDCCH corresponding to the DCI format 0. The base station and UE interpret the corresponding resource allocation type indicator bit and process the uplink data channel.

The above solution ensures that the payload size of DCI format 0 does not change after the resource allocation type indicator bit is added to DCI format 0, and it is easy to implement the solution.

It should be noted that the relational terms herein such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion. Therefore, a process, method, article, or device that includes a series of elements not only includes such elements, but also includes other elements not specified expressly, or may include inherent elements of the process, method, article, or device. If no more limitations are made, an element limited by "including one . . . " does not exclude other same elements existing in the process, method, article, or device that includes the element.

A person of ordinary skill in the art may understand that all or a part of the steps of the foregoing method embodiments may be implemented by a program instructing relevant hardware. The program may be stored in a computer readable storage medium. The storage medium may include a ROM/RAM, a magnetic disk, and an optical disk.

The foregoing descriptions are merely exemplary embodiments of the present invention, but are not intended to limit the protection scope of the present invention. Any modifications, equivalent replacements, or improvements made within the spirit and principle of the present invention should fall within the protection scope of the present invention.

What is claimed is:

1. A method for detecting information, comprising:
   determining, by a user equipment (UE), a search space of a D-physical downlink control channel (D-PDCCH), wherein the search space comprises at least one D-PDCCH candidate detection position at a specific aggregation level;
   obtaining, by the UE, a mapping relationship between antenna port information of at least one antenna port occupied by the D-PDCCH and second information, wherein the second information comprises:
   an aggregation level of the D-PDCCH; or
   resources occupied by the D-PDCCH; or
   a combination of an aggregation level of the D-PDCCH and resources occupied by the D-PDCCH; and
   detecting, by the UE, the D-PDCCH in the search space according to the obtained mapping relationship.

2. The method according to claim 1, wherein the mapping relationship between the antenna port information and resources occupied by the D-PDCCH comprises any one or any combination of the following mapping relationships:
a mapping relationship between the antenna port information and time-domain resources where the D-PDCCH is located;
a mapping relationship between the antenna port information and a resource block (RB) where the D-PDCCH is occupied;
a mapping relationship between the antenna port information and a control channel element (CCE) where the D-PDCCH is occupied; or
a mapping relationship between the antenna port information and a candidate detection position at a specific aggregation level.

3. The method according to claim 1, wherein:
the antenna port information comprises one type, and the obtained mapping relationship is a one-to-one or one-to-many mapping relationship; or
the antenna port information comprises at least two types, and the obtained mapping relationship is a many-to-one or many-to-many mapping relationship.

4. The method according to claim 1, wherein the antenna port information is obtained through broadcast signaling, radio resource control (RRC) dedicated signaling, or media access control (MAC) layer signaling, or physical layer signaling.

5. A method for transmitting information, wherein the method is applicable to a base station and comprises:
determining, by a base station, a search space of a D-physical downlink control channel (D-PDCCH), wherein the search space comprises at least one D-PDCCH candidate detection position at a specific aggregation level; and
obtaining, by the base station, a mapping relationship between antenna port information of at least one antenna port occupied by the D-PDCCH and second information, wherein the second information comprises:
an aggregation level of the D-PDCCH; or
resources occupied by the D-PDCCH; or
a combination of an aggregation level of the D-PDCCH and resources occupied by the D-PDCCH; and
transmitting, by the base station, the D-PDCCH in the search space to a user equipment (UE) according to the obtained mapping relationship.

6. The method according to claim 5, wherein the mapping relationship between the antenna port information and resources occupied by the D-PDCCH comprises any one or any combination of the following mapping relationships:
a mapping relationship between the antenna port information and time-domain resources where the D-PDCCH is located;
a mapping relationship between the antenna port information and a resource block (RB) where the D-PDCCH is occupied;
a mapping relationship between the antenna port information and a control channel element (CCE) where the D-PDCCH is occupied; or
a mapping relationship between the antenna port information and a candidate detection position at a specific aggregation level.

7. The method according to claim 5, wherein:
the antenna port information comprises one type, and the obtained mapping relationship is a one-to-one or one-to-many mapping relationship; or
the antenna port information comprises at least two types, and the obtained mapping relationship is a many-to-one or many-to-many mapping relationship.

8. A user equipment (UE), comprising:
a memory storage comprising a program;
one or more processors in communication with the memory storage, wherein the one or more processors execute the program to:
determine a search space of a D-physical downlink control channel (D-PDCCH), wherein the search space comprises at least one D-PDCCH candidate detection position at a specific aggregation level;
obtain a mapping relationship between antenna port information of at least one antenna port occupied by the D-PDCCH and second information, wherein the second information comprises:
an aggregation level of the D-PDCCH; or
resources occupied by the D-PDCCH; or
a combination of an aggregation level of the D-PDCCH and resources occupied by the D-PDCCH; and
a receiver in communication with the processor and adapted to detect the D-PDCCH in the search space according to the obtained mapping relationship.

9. The user equipment according to claim 8, wherein the mapping relationship between the antenna port information and resources occupied by the D-PDCCH comprises any one or any combination of the following mapping relationships:
a mapping relationship between the antenna port information and time-domain resources where the D-PDCCH is located;
a mapping relationship between the antenna port information and a resource block (RB) where the D-PDCCH is occupied;
a mapping relationship between the antenna port information and a control channel element (CCE) where the D-PDCCH is occupied; or
a mapping relationship between the antenna port information and a candidate detection position at a specific aggregation level.

10. The user equipment according to claim 8, wherein:
the antenna port information comprises one type, and the obtained mapping relationship is a one-to-one or one-to-many mapping relationship; or
the antenna port information comprises at least two types, and the obtained mapping relationship is a many-to-one or many-to-many mapping relationship.

11. A base station, comprising:
a transmitter;
a memory storage comprising a program;
one or more processors in communication with the transmitter and the memory storage, wherein the one or more processors execute the program to: determine a search space of a D-physical downlink control channel (D-PDCCH), wherein the search space comprises at least one D-PDCCH candidate detection position at a specific aggregation level; and
a receiver, in communication with the processor and adapted to obtain a mapping relationship between antenna port information of at least one antenna port occupied by the D-PDCCH and second information, wherein the second information comprises:
an aggregation level of the D-PDCCH; or
resources occupied by the D-PDCCH; or
a combination of an aggregation level of the D-PDCCH and resources occupied by the D-PDCCH; and wherein the transmitter is adapted to transmit the D-PDCCH in the search space to a user equipment (UE) according to the obtained mapping relationship.

12. The base station according to claim 11, wherein the mapping relationship between the antenna port information and resources occupied by the D-PDCCH comprises any one or any combination of the following mapping relationships:
   a mapping relationship between the antenna port information and time-domain resources where the D-PDCCH is located;
   a mapping relationship between the antenna port information and a resource block (RB) where the D-PDCCH is occupied;
   a mapping relationship between the antenna port information and a control channel element (CCE) where the D-PDCCH is occupied; or
   a mapping relationship between the antenna port information and a candidate detection position at a specific aggregation level.

13. The base station according to claim 11, wherein:
   the antenna port information comprises one type, and the mapping relationship obtained by the receiver is a one-to-one or one-to-many mapping relationship; or
   the antenna port information comprises at least two types, and the mapping relationship obtained by the receiver is a many-to-one or many-to-many mapping relationship.

* * * * *

UNITED STATES PATENT AND TRADEMARK OFFICE
CERTIFICATE OF CORRECTION

| | | |
|---|---|---|
| PATENT NO. | : 10,797,843 B2 | Page 1 of 1 |
| APPLICATION NO. | : 16/216348 | |
| DATED | : October 6, 2020 | |
| INVENTOR(S) | : Guan et al. | |

It is certified that error appears in the above-identified patent and that said Letters Patent is hereby corrected as shown below:

In the Specification

Column 13, Line 23: replace "the detecting the" with --detecting the--

In the Claims

Column 28, Claim 1, Line 60: replace "D-PDCCH; or" with --D-PDCCH;--
Column 29, Claim 4, Line 25: replace "signaling, or media" with --signal, media--
Column 29, Claim 5, Line 41: replace "D-PDCCH; or" with --D-PDCCH;--
Column 30, Claim 8, Line 17: replace "D-PDCCH; or" with --D-PDCCH;--
Column 30, Claim 11, Line 64: replace "D-PDCCH; or" with --D-PDCCH;--

Signed and Sealed this
Twenty-second Day of November, 2022

Katherine Kelly Vidal
*Director of the United States Patent and Trademark Office*